United States Patent [19]

Ellis

[11] Patent Number: 5,096,154
[45] Date of Patent: Mar. 17, 1992

[54] MAGNETIZED GAS CAP

[76] Inventor: John E. Ellis, 4144-1/2 Normal Ave., Los Angeles, Calif. 90029

[21] Appl. No.: 754,584

[22] Filed: Sep. 4, 1991

Related U.S. Application Data

[62] Division of Ser. No. 540,280, Jul. 16, 1990, which is a division of Ser. No. 402,915, Sep. 5, 1989, Pat. No. 4,957,266.

[51] Int. Cl.$^5$ ............................................. A47G 1/17
[52] U.S. Cl. .............................. 248/683; 248/206.5; 248/309.4
[58] Field of Search ............... 248/309.1, 205.2, 206.5, 248/309.4, 205.3, 683, 686; 224/42-43, 273; 296/97.22; 220/DIG. 33

[56] References Cited

U.S. PATENT DOCUMENTS

| | | | |
|---|---|---|---|
| 2,702,683 | 2/1955 | Green | 220/85 CH |
| 3,266,633 | 8/1966 | Graebner | 248/309.4 X |
| 3,337,892 | 8/1967 | Speyer | 248/309.4 X |
| 4,653,711 | 3/1987 | Marshell | 220/85 CH X |
| 4,746,089 | 5/1988 | Clapper | 248/309.4 |

FOREIGN PATENT DOCUMENTS 2741968 12/1978 Fed. Rep. of Germany ... 296/97.22

*Primary Examiner*—J. Franklin Foss
*Attorney, Agent, or Firm*—Poms, Smith, Lande & Rose

[57] ABSTRACT

A magnetized gas cap that is totally removable from the top of the gas tank filling tube of a vehicle. The cap can thus be removed and magnetically adhered to a metallic part of the car while filling the tank. The cap can then be replaced and cannot be lost even if the operator forgets to replace the cap.

3 Claims, 1 Drawing Sheet

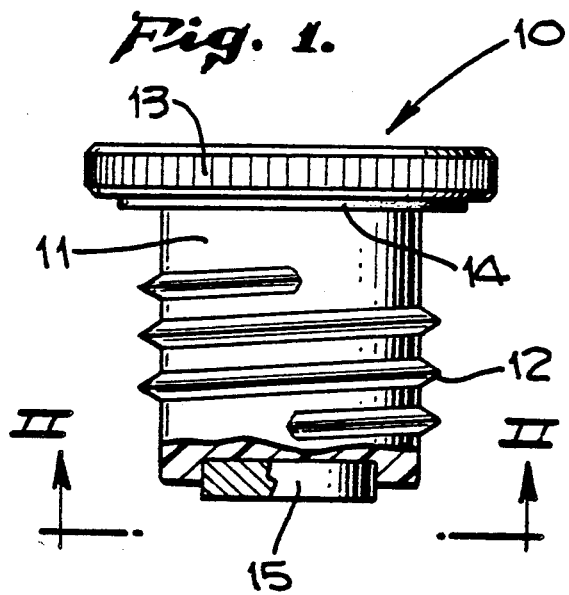
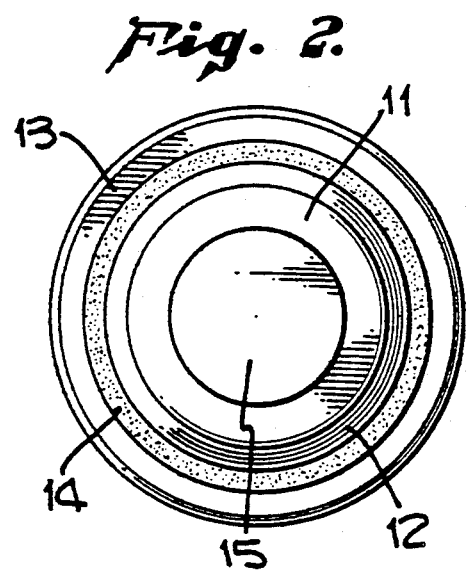
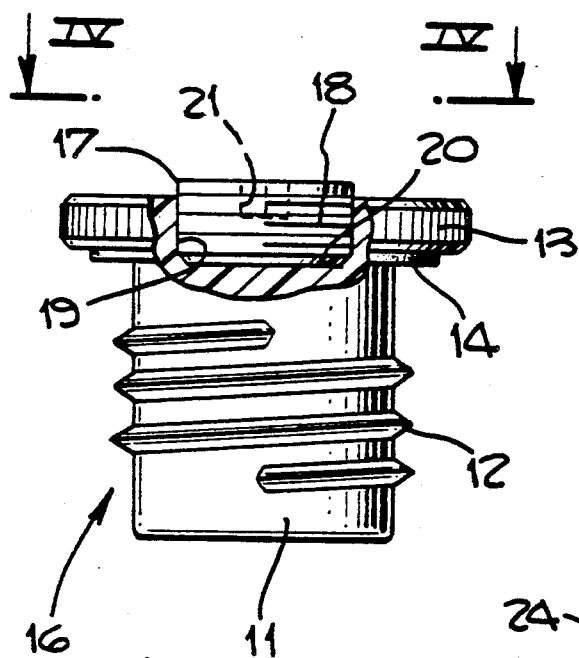
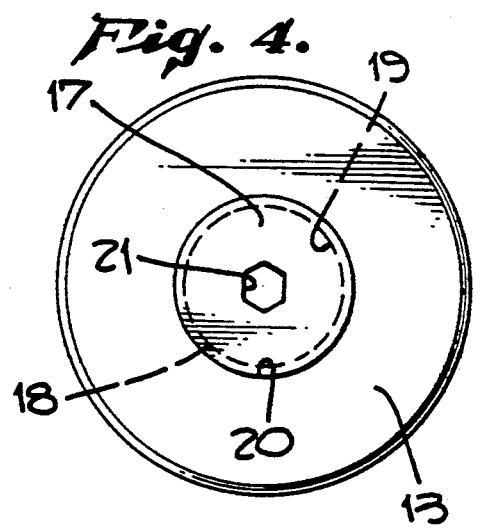
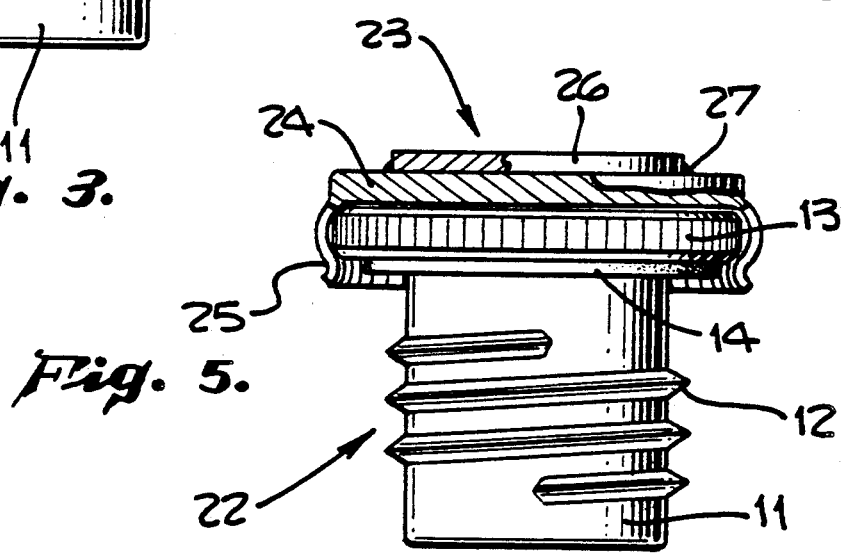

MAGNETIZED GAS CAP

This is a divisional of copending application Ser. No. 07/540,280 filed on July 16, 1990 which was a divisional of application Ser. No. 07/402,9 filed Sept. 5, 1989, now U.S. Pat. No. 4,957,266.

BACKGROUND OF THE INVENTION

1. Field of the Invention

The invention relates to gas caps; and, more particularly, to a removable gas cap for a vehicle which can be magnetically adhered to the vehicle during filling and then be replaced.

2. Description of the Prior Art

When a vehicle operator desires to fill his gas tank with gasoline, he must remove the cap and, in some cases, the operator places it where it is forgotten and can be easily lost. In U.S. Pat. No. 4,653,711 to Marshell, there is disclosed a gas cap holder which is secured, as by adhesive, to a part of a vehicle, such as the interior of the fuel tank access door, and can hold the gas cap therein during filling. Of course, such holder can lose its adhesion after a period of time and, if the operator forgets the cap and drives off, the holder may work loose and the cap will fall off. In U.S. Pat. No. 4,746,089, Clapper discloses the use of a magnet which is attached to the inside of the fuel tank access door. The conventional gas cap is then adhered to this magnet. However, not all caps are of sufficient metallic material to adhere to a magnet. Also, the magnet must be in a non-visible location, must of course be installed and, since the magnet is between the car and cap, the cap may fall off. There is thus a need for a cap which can replace the preexisting cap or be provided as original equipment which can be magnetically attached directly to any metallic part of the vehicle body.

SUMMARY OF THE INVENTION

It is an object of this invention to provide a gas cap that magnetically attaches to the body of a vehicle.

It is a further object of this invention to provide a gas cap of a magnetic material that is detachable from the filling tube of a gas tank and can be magnetically attached to a metallic part of a vehicle body.

These and other objects are preferably accomplished by providing a magnetized gas cap that is totally removed from the top of the gas tank filling tube of a vehicle. The cap can thus be removed and magnetically adhered to a metallic part of the car while filling the tank. The cap can then be replaced and cannot be lost even if the operator forgets to replace the cap.

BRIEF DESCRIPTION OF THE DRAWING

FIG. 1 is a vertical view, partly in section, of a gas cap in accordance with the teachings of the invention;

FIG. 2 is a view taken along lines II—II of FIG. 1;

FIG. 3, is a vertical view, partly in section, of a second embodiment of a gas cap in accordance with the teachings of the invention;

FIG. 4 is a view taken along lines IV—IV of FIG. 3; and

FIG. 5 is a vertical view, partly in section, of a third embodiment of a gas cap in accordance with the teachings of the invention.

DESCRIPTION OF THE PREFERRED EMBODIMENT

Referring now to FIG. 1 of the drawing, a fuel tank gas cap 10 is shown having a generally cylindrical hollow tubular main body portion 11 with external threads 12 for threading cap 10 into the filling tube of a vehicle. An annular sealing flange 13, which may be knurled about the periphery and of an outer diameter greater than the outer diameter of body portion 11, is integral with or otherwise secured to body portion 11. A resilient annular sealing ring 14 (see also FIG. 2) may be provided on the underside of cap 10. The body portion 11 of cap 10 may be of plastic or metallic material. The foregoing has described a conventional gas cap which forms no part of the invention other than in the environment of the invention. Further, my invention is applicable to any conventional gas cap.

Thus, as particularly contemplated in the present invention, an annular ring 15 of metallic material is embedded in or otherwise secured to body portion 11. It can be understood that, when gas cap 10 is removed from a filling tube, it can be magnetically secured to any metallic part of the vehicle, then replaced after filling. Should the operator drive off and forget the cap 10, it will remain positively secured to the vehicle body.

As seen in FIG. 3 wherein like numerals refer to like parts of the cap of FIG. 1, a cap 16 is shown where, in place of ring 15, a plug or insert 17 of a metallic material is threaded, via mating threads 18 on insert 17 and threads 19 (FIG. 4) on a cavity 20 in flange 13, into cavity 20. Cavity 20 is thus generally centrally disposed in flange 13 and, as particularly seen in FIG. 4, has a hexagonally shaped socket 21 for receiving a like configured tool (not shown), such as an allen wrench, therein to rotate the same and, thus, removably secure insert 17 in cavity 20. Of course, instead of being threaded into cavity 20, insert 17 can be merely glued or soldered therein. Also, the cap may be of plastic molded about insert 17. The cap 16 can thus be easily magnetically attached to any metallic part of a vehicle body.

As seen in FIG. 5, where again like numerals refer to like parts of the cap of FIG. 1, another embodiment of the invention is shown. In this embodiment, cap 22 has a conventional body portion 11, threads 12, flange 13 and ring 14. However, a removable magnetic cap 23 is provided having a main body portion 24 conforming to the configuration of flange 13 (such as round) with an integral downwardly depending resilient gripping clip-on skirt 25 adapted to snap-fit about the outer knurled periphery of flange 13. Of course, resilient flexible claws may be used in place of skirt 25. A magnetic plate 26 is fixedly secured, such as by soldering 27, to the upper surface of flange 13. This plate 26 can also be circular and, as seen in FIG. 5, smaller in outer diameter than portion 24.

Thus, cap 23 can be quickly and easily snap-fit onto any preexisting gas cap forming a cap 22 as seen in FIG. 5 which can be quickly and easily magnetically attached to any metallic portion of a vehicle.

The caps herein can be easily removed from the vehicle body after filling the tank and replaced. If the operator forgets to replace the cap and drives off, it will remain secured to the vehicle body and will not fall off or get lost.

Although magnetic inserts have been disclosed, obviously any portion of the caps 10, 16, and 23 can be made of magnetic material or a mixture of metallic and magnetic material. Such a cap, if body portion 11 was so made of this material, will insure a tight fit to the filling tube. Although a screw-threaded body portion 11 has been disclosed, obviously such body portion 11 may have ears or lugs, or any other suitable means, for mating with like configuration connecting means on the vehicle filling tube. In all embodiments, the operator's hands will be free at all times and the operator does not have to hold on to the cap. The caps herein may be used to replace the preexisting cap of the vehicle, may be provided as original equipment on the vehicle, or, as in the FIG. 5 embodiment, be an after market item attachable to any preexisting gas cap.

I claim:

1. A gas cap for closing off the filling tube of a vehicle having a screw hollow cylindrical main body portion closed off at the top by a flange of an outer diameter greater than the outer diameter of said main portion, the improvement which comprises:

magnetic means associated with said cap for magnetically adhering to a metallic part of the body of the vehicle;

and wherein said magnetic means includes a cavity in said flange and a magnetic insert secured in said cavity.

2. In the cap of claim 1 wherein said cavity is threaded and said insert has threads thereon mating with said threaded cavity.

3. In the cap of claim 2 including a hexagonally shaped socket in said insert for receiving a like configured tool therein.

* * * * *